US011722329B2

(12) United States Patent
Condorovici et al.

(10) Patent No.: US 11,722,329 B2
(45) Date of Patent: Aug. 8, 2023

(54) GAZE REPOSITIONING DURING A VIDEO CONFERENCE

(71) Applicant: FotoNation Limited, Galway (IE)

(72) Inventors: Razvan Condorovici, Bucharest (RO); Andra Stan, Brasov (RO)

(73) Assignee: FotoNation Limited

( * ) Notice: Subject to any disclaimer, the term of this patent is extended or adjusted under 35 U.S.C. 154(b) by 0 days.

(21) Appl. No.: 17/495,800

(22) Filed: Oct. 6, 2021

(65) Prior Publication Data

US 2023/0105206 A1    Apr. 6, 2023

(51) Int. Cl.
*H04L 12/18* (2006.01)
*G06V 20/40* (2022.01)
*G06V 40/18* (2022.01)

(52) U.S. Cl.
CPC .......... *H04L 12/1831* (2013.01); *G06V 20/46* (2022.01); *G06V 40/18* (2022.01); *H04L 12/1822* (2013.01)

(58) Field of Classification Search
CPC .... G06V 20/46; G06V 40/18; H04L 12/1831; H04N 7/141; H04N 7/15; H04N 7/151
USPC ....... 348/14.03–14.9; 709/204–206; 455/414
See application file for complete search history.

(56) References Cited

U.S. PATENT DOCUMENTS

| | | | | |
|---|---|---|---|---|
| 2012/0274736 A1* | 11/2012 | Robinson | ............ | H04L 65/1083 |
| | | | | 348/E7.083 |
| 2013/0271560 A1* | 10/2013 | Diao | .................. | H04L 12/1827 |
| | | | | 348/14.08 |
| 2017/0308992 A1* | 10/2017 | Chalom | ............... | G06V 40/197 |
| 2021/0281802 A1* | 9/2021 | Kirisken | ............. | G02B 27/017 |
| 2022/0286314 A1* | 9/2022 | Meyer | .................... | G06F 3/013 |

FOREIGN PATENT DOCUMENTS

EP        3539054 A1      9/2019

OTHER PUBLICATIONS

Yaroslav Ganin et al, "DeepWarp: Photorealistic Image Resynthesis for Gaze Manipulation", European Conference on Computer Vision, 2016.
Tobias Fischer et al., "RT-GENE: Real-Time Eye Gaze Estimation in Natural Environments", European Conference on Computer Vision, 2018.
Leo F. Isikdogan, "Eye Contact Correction using Deep Neural Networks", Computer Vision and Pattern Recognition, 2019.

* cited by examiner

*Primary Examiner* — Maria El-Zoobi
(74) *Attorney, Agent, or Firm* — Lerner David LLP

(57) ABSTRACT

A method at a first participant's client conferencing system in a videoconference comprises receiving, from a second client conferencing system, at least one first video frame of a first video signal including an image of the second participant looking at a third participant, and first metadata associated with the first video frame and including an identity of the third participant. The image of the second participant is modified in the first video frame so that the first video frame is displayed on a first area of the client conferencing system with the second participant looking at a second area of the first display configured for displaying a second video signal of the third participant identified by the first metadata.

15 Claims, 9 Drawing Sheets

| Frame M | Frame N | Frame O | Frame P |
|---|---|---|---|
| Alice Display with Marked Gaze Target Participant | | | |
| Alice Video Frame | | | |
| Bob | Bob | Dan | Carol |
| Video Frame Metadata | | | |

Figure 5

GAZE REPOSITIONING DURING A VIDEO CONFERENCE

FIELD

The present invention relates to gaze repositioning during a video conference.

BACKGROUND

In physical conferences, the participants meet in a same real world environment (e.g., a conference room) so that the participants can look each other in the eyes. In this way, all the participants have instant visual feedback of what the other participants are doing and to whom they are paying attention.

However, this information is lost in the virtual environment provided by a video conference. For example, considering a meeting that is taking place in a conference room, where Alice, Bob, Carol, and Dan are present, if Bob is speaking and Alice is looking at him, everyone else in the room, including Carol and Dan, notices that Alice is looking at Bob and, therefore, is aware that Alice is paying attention to what Bob is saying. Instead, in a videoconference involving Alice, Bob, Carol, and Dan, if Bob is speaking and Alice is looking at him, a video signal acquired by Alice's videoconference system will be displayed on Carol's and Dan's displays with Alice looking at a display area that might not correspond to the display area where a video signal acquired by Bob's videoconference system is displayed. As such, Carol and Dan might not be aware that Alice is paying attention to what Bob is saying.

This drawback of video conferencing versus face-to-face interactions is not addressed by known solutions for improving participation in a video conference. For example, Yaroslav Ganin et al, "DeepWarp: Photorealistic Image Resynthesis for Gaze Manipulation", European Conference on Computer Vision, 2016 discloses that if a video camera is not placed straight in front of a given participant, thus giving the impression to the other participants that the given participant is looking away, the gaze of the given participant is retargeted in the video signal acquired by the video camera, so that it seems to the other participants that the given participant is looking straight into the video camera (and therefore, straight into the eyes of each of the other participants).

SUMMARY

According to the present invention, there are provided methods according to claims 1, 10 and 14.

Embodiments of the invention rely on detection and manipulation of the gaze of participants of a videoconference to provide a solution whereby, if a given participant is looking at a video of an identified target participant, the gaze direction of the given participant is retargeted at a videoconference system of at least one other participant of the videoconference so that, when the video signal of the given participant is displayed, the given participant looks toward a display area where the video signal of the target participant is displayed. In this way, the other participant is aware that the given participant is paying attention to the target participant, thus improving the visual feedback and social connections in the virtual setup of the videoconference.

In particular, embodiments of the invention involve at least a first conferencing system associated with a first participant of a videoconference:

modifying a video signal received from a second client conferencing system associated with a second participant looking at a third, target, participant of the videoconference, so that to retarget a gaze direction of the second participant toward a display area of the first client conferencing system configured to display a video signal of the target participant, according to metadata received with the video signal and including an identity of the target participant; and/or generating metadata identifying a target participant to whom the first participant is looking at on a display area of the first videoconference system, and sending the generated metadata with the video signal of the first participant to at least one client conferencing system associated with another participant of the video conference, so that the metadata can be used, at the receiving conferencing system, to retarget the gaze direction of the first participant toward a display area configured to display the video signal of the target participant.

Further aspects of the invention include client conferencing systems, a videoconferencing setup system, and related computer program products configured to perform the methods according to the invention.

BRIEF DESCRIPTION OF THE DRAWINGS

Embodiments of the invention will now be described, by way of example, with reference to the accompanying drawings, in which:

FIG. 3b shows a flow diagram illustrating a method that can be operated by any of the client conferencing systems illustrated in FIG. 1 for repositioning the gaze of a participant associated with another client conferencing system, based on metadata generated by the other client conferencing system according to the operation of the method illustrated in FIG. 3a;

FIG. 4 shows a layout of a display of a client video conferencing system illustrated in FIG. 1, during the operation of the method illustrated in FIG. 3a;

FIG. 5 shows a plurality of metadata that can be generated by the operation of the method of FIG. 3a at a client conferencing system illustrated in FIG. 1, each associated with a corresponding video frame of the participant using the client conferencing system;

DESCRIPTION OF THE EMBODIMENTS

Figure 1:
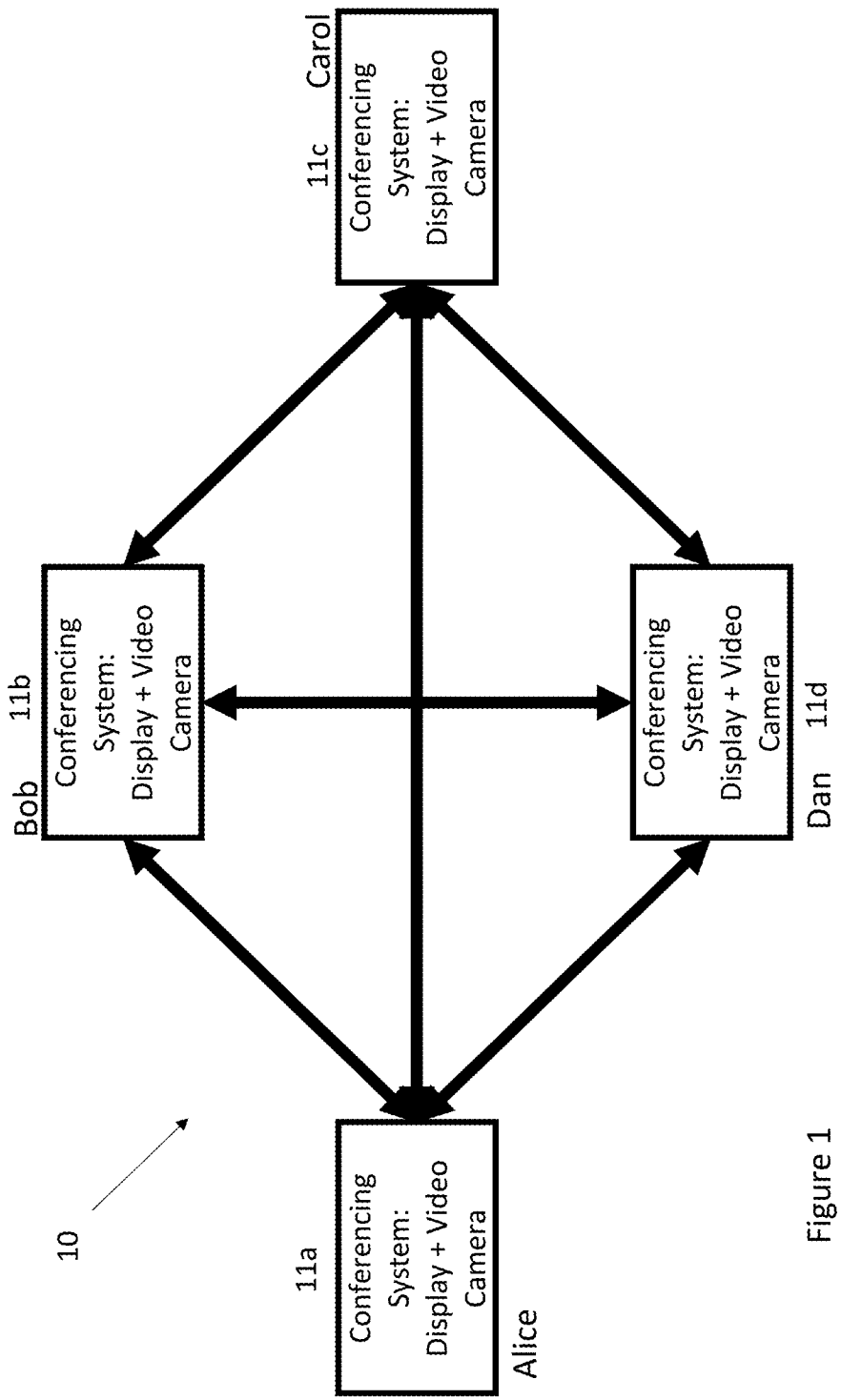
FIG. 1 shows a videoconferencing setup system according to an embodiment of the present invention, including at least four client video conferencing systems associated with respective participants of a videoconference.

Referring now to FIG. 1, there is shown a video conferencing system 10 including four client conferencing systems 11a-11d associated, respectively, to four participants of a video conference, e.g., Alice, Bob, Carol, and Dan. It is to be appreciated that the video conference can involve a number of client conferencing systems different than the illustrated one, e.g., three or more than four client conferencing systems The client conferencing systems 11a-11d are configured to acquire audio and video signals from the respective participants and are operably in communication with each other so that each of the systems can transmit their acquired audio and video signals to the other systems. In particular, with reference to FIG. 2, each of the client conferencing systems 11a-11d comprises at least:

- a video camera 12 and a microphone 13 configured to capture, respectively, video and audio signals of the respective videoconference participant;
- speakers and/or headphones 16 configured to play audio signals received from other conferencing systems involved in the videoconference; and
- a display 15 and a render module 14 configured to control the display 15 to display video signals received from other client conferencing systems involved in the videoconference. In particular, the render module 14 is configured to determine screen areas that are allocated for displaying each of the video flows received from the other client conferencing systems involved in the videoconference, as well as possibly the video signal acquired by the video camera 12. Optionally, the render module 14 can be configured to receive a user's input and modify the default screen area assignment in case the user's input indicates a preference to a different screen area assignment.

Each of the client conferencing systems 11a-11d further comprises at least:

- a gaze understanding module 17 configured to detect, in each acquired video frame containing the face of the participant using the client conferencing system, a gaze direction toward a target position of the display 15;
- a metadata generation module 18 configured to: associate the target position of the display 15 with a display area allocated by the render module 14 for displaying a video signal of another, target, participant involved in a videoconference, and generate metadata that includes an identity of the target participant; and
- a gaze retargeting module 19 configured to: interpret metadata received with a video signal from another client conferencing system involved in a videoconference and containing an identify of a target participant looked by the participant using the other client conferencing system, and modify the gaze direction in the received video signal so that the received video signal is displayed in a respective area of the display 15 allocated by the render module 14 with the participant's gaze directed toward a display area allocated for displaying the video signal of the target participant.

Figure 3A:
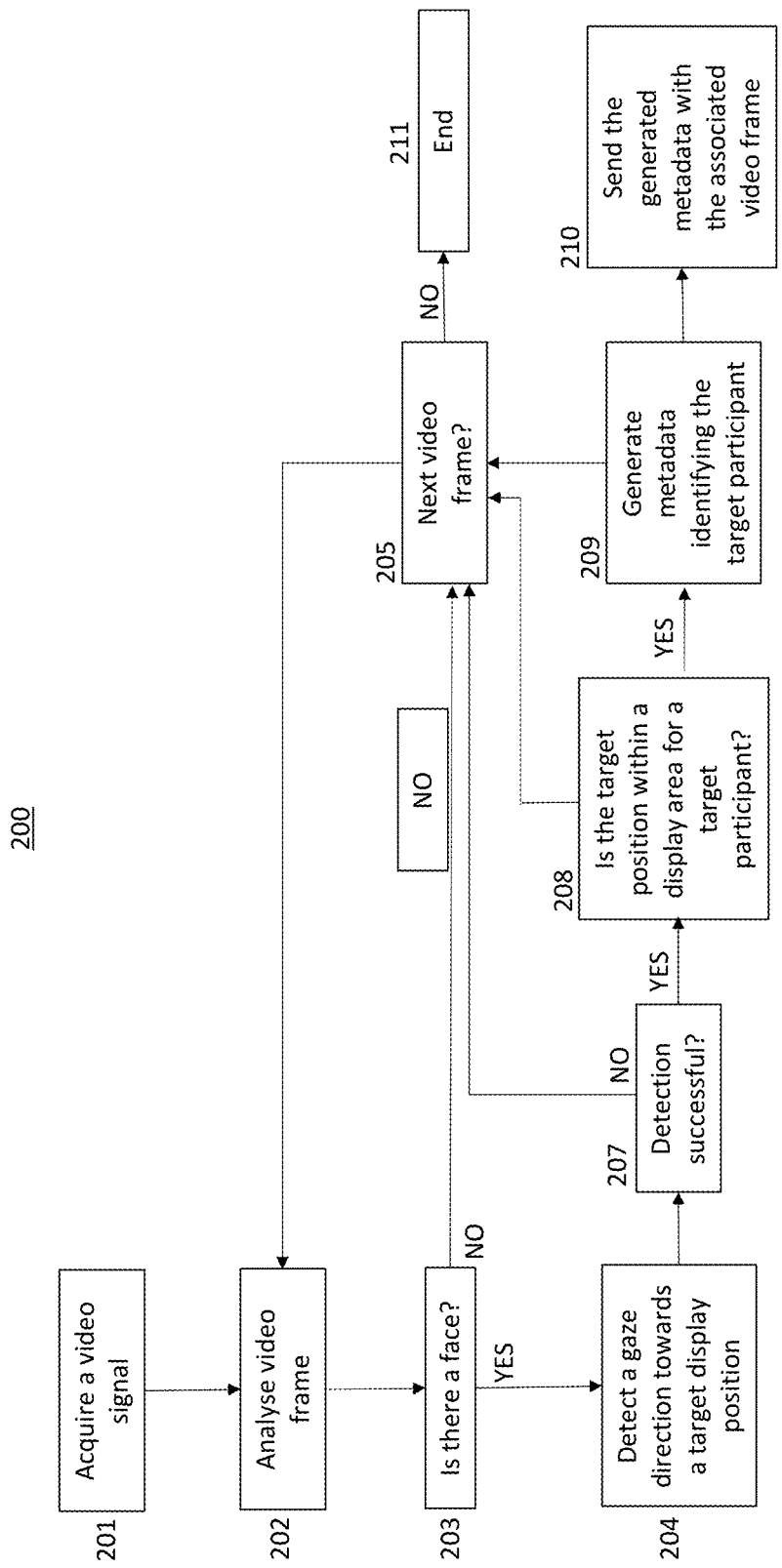
FIG. 3a shows a flow diagram illustrating a method that can be operated by any of the client conferencing systems illustrated in FIG. 1 for generating and transmitting metadata identifying a target participant of the video conference looked at by the participant associated with the client conferencing system.
Figure 3B:
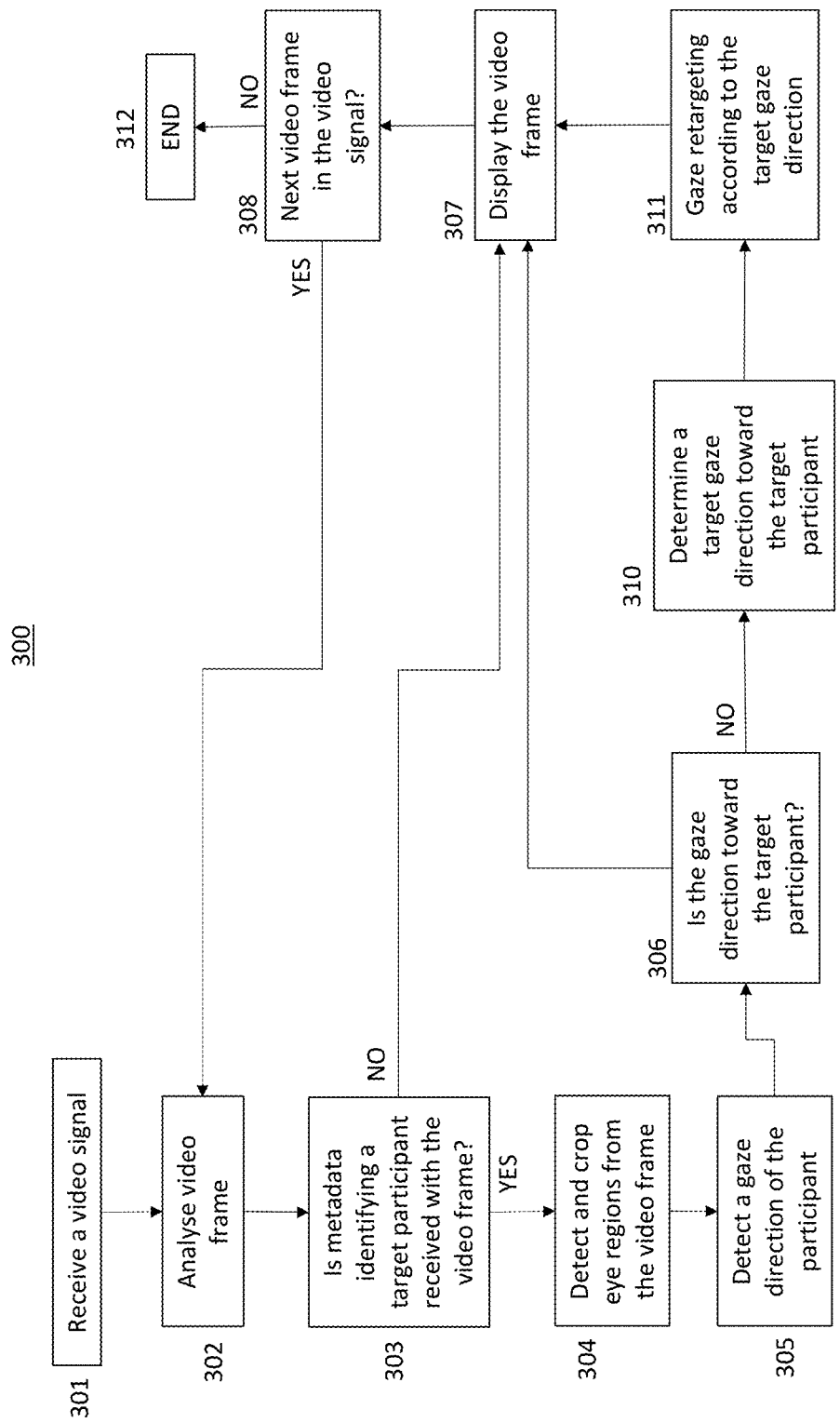

The configuration and functionality of the modules 17-19 will be now disclosed in more detail by referring to the operation of methods 200 and 300 illustrated in FIGS. 3a and 3b, that can be performed by the client conferencing systems 11a-11d according to embodiments of the invention.

Figure 4:
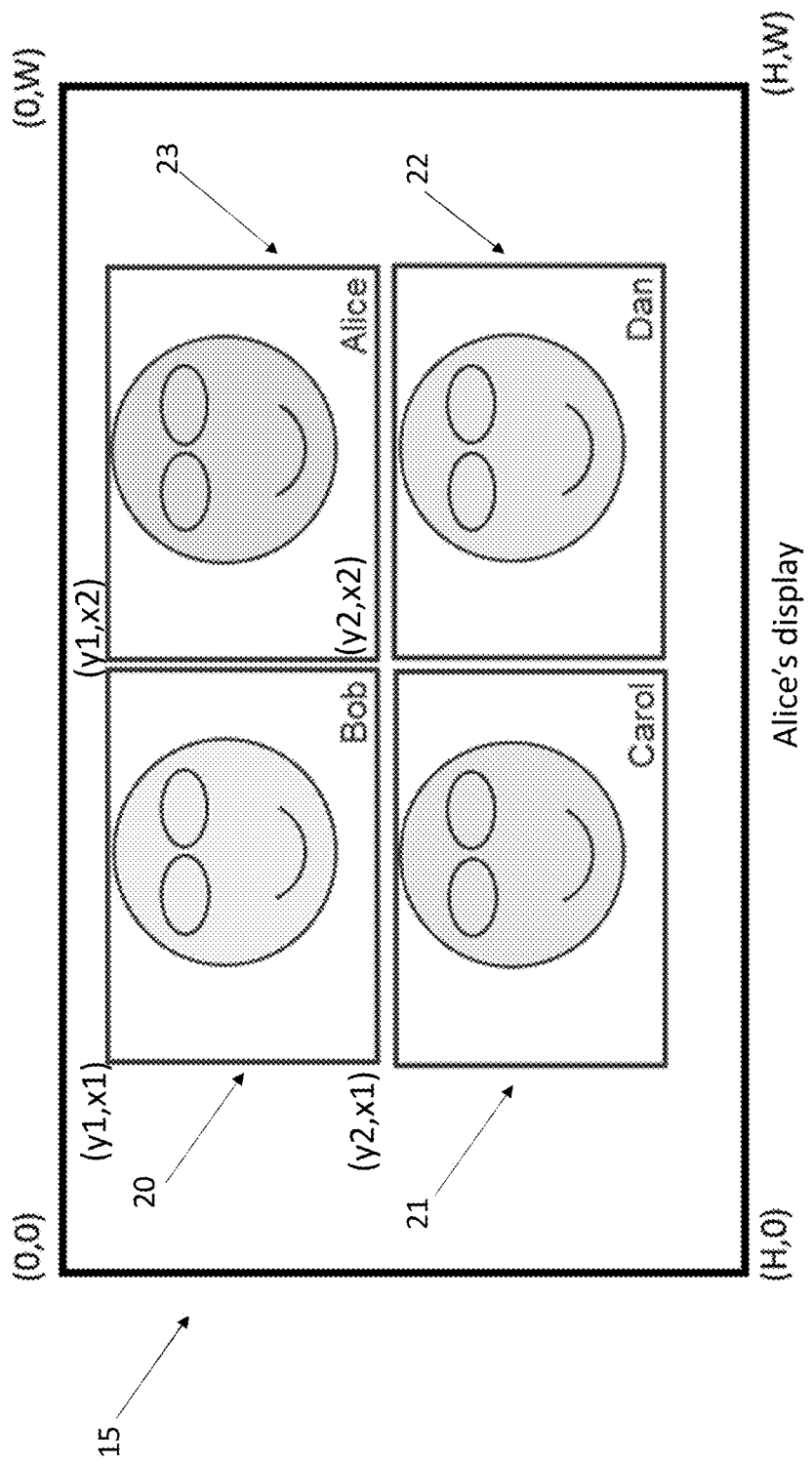

In particular, a starting situation is considered where for example Alice's client conferencing system 11a is receiving video signals captured by the video cameras 12 of the other systems 11b-11d, during a videoconference involving Alice, Bob, Dan and Carol. With reference to FIG. 4, frames from these video signals are displayed, by the render module 14 of the system 11a, on respective areas 20-23 of the display 15. It is to be appreciated that, if at least one of the systems 11b-d is not transmitting, at any given time, a video signal of the respective participant (e.g., because the video cameras 12 of the system is switched-off, not plugged or not working properly, or because a video signal transmission failure), the render module 14 of the system 11a can display on the allocated area, instead of the missing video signal, a static image identifying the participant (e.g., a photo or other image/symbol including an identification of the participant, such as the name initial letters), that can be flashed or otherwise highlighted if the associated participant is speaking (so as to attract the attention of the other participants).

With reference now to FIG. 3a, the method 200 comprises a first step 201 where a video signal is acquired from the video camera 12 of Alice's client conferencing system 11a. This may correspond with the start of the video conferencing session or Alice may switch on her camera feed during the video conferencing session. Consecutive frames of the video signal can be displayed, by the render module 14, on a respective area 23 of the display 15 of the system 11a, as illustrated in FIG. 4—although in some cases, a user such as Alice may decide not to show their video signal on their computer. It is to be appreciated that the display layout of the areas 20-23 illustrated in FIG. 4 is only exemplary, and the default position of the areas 20-23 allocated by the render module 14 can be different than the illustrated one. For example, the areas 23 and 20 allocated for displaying Alice's and Bob's video signals can be swapped, according to a convention whereby the video signal of the user of a conferencing system is displayed as a first video in a displayed array of videos of the videoconference participants. It is to be further appreciated that the position and size of the areas 20-23 allocated by the render module 14 is not static, and in fact can be modified at any given time by the render module 14 (e.g., in response to a received user input or in response to one or more participants leaving, joining, beginning to speak or stopping speaking during the videoconference).

With reference now to FIG. 5, it is assumed for example that:

- two frames M and N of the video signal include an image of Alice looking at the display area 20 where Bob's video signal is displayed (or where a static image of Bob is displayed, absent a received video signal from the system 11b), e.g., because Bob is speaking, and
- two frames O and P of the acquired video signal include an image of Alice looking, respectively, at the display areas 22 and 21 where Dan's and Carol's video signals are displayed (or where a static image of Dan's and/or Carol's is displayed, absent a received video signal from the systems 11d and/or 11c), e.g., because Dan starts to speak after Bob, and Carol after Dan.

It is to be appreciated that FIG. 5 illustrates only some exemplary frames of the video signal acquired at step 201. As a video frame has typically a duration of some tens of milliseconds, according to the acquisition rate, it is to be further appreciated that longer sequences of consecutive video frames where Alice is looking at a same participant can be present in a video signal acquired by the video camera 12 of the system 11a, as well as that some video frames might not contain Alice's face (e.g., because Alice momentarily leaves her position in front of the video camera 12, or turns her back on the camera 12). As such, frames M, N, O and P should not necessarily be regarded as successively acquired frames.

With reference back to FIG. 3a, an acquired video frame, such as frame M in FIG. 5, is considered for analysis at step 202 of the method 200. In particular, the gaze understanding module 17 (or another dedicated module or component of the system 11a) detects, at step 203, whether the video frame M includes Alice's face. In the case of the video frame M under analysis, the face detection is successful. However, if there is a determination at step 203 that a video frame under analysis does not include Alice's face, the method proceeds to the next video frame (step 205) in the acquired video signal. If a next video frame is available, the next video frame is analysed (step 202) and the method continues from step 203, by operating face detection in the next video frame.

In response to determining that the video frame M includes Alice's face, the gaze understanding module 17 operates, at step 204, to map Alice's gaze direction to a target position on the display 15. One example of determining eye gaze direction is disclosed in Tobias Fischer et al., "RT-GENE: Real-Time Eye Gaze Estimation in Natural Environments", European Conference on Computer Vision, 2018. Another example, of detecting gaze angle (as well as eye opening) is disclosed in European Patent No. 3539054 (Ref: FN-630-EP), the disclosure of which is herein incorporated by reference. Some methods for gaze detection rely on a calibration procedure that can be performed at the beginning of the videoconference, where Alice is prompted by the system 11a to look at the four corners of the display 15 (indicated with coordinates 0,0; 0,W; H,0; H,W, respectively, in FIG. 4). Detected directions of Alice's gaze toward the display corners stored in a memory of the system 11a (or in any other memory accessible by the system 11a) can be used by the gaze understanding module 17 to transform a subsequently detected Alice's gaze direction into a target position on the display 15. Nonetheless, it will be appreciated that any form of gaze direction determination is suitable for use in the present application, as long as it can provide a reliable indication of which, if any, of the speakers in a video conference a given user is looking towards at any given time.

The method 200 then proceeds by determining, at step 207, whether a target display position has been successfully detected at step 204. In case of the video frame M under analysis, the determination is positive. However, if there is a determination at step 207 that a target display position has not been successfully identified (e.g., because in a video frame under analysis Alice is looking away from the display 15, for example because she is looking at a document on her desk or she is speaking to someone else in her environment), the method proceeds by moving to the analysis of the next video frame in the video signal acquired by the video camera 12 of the system 11a, step 202. Note that the analysis does not have to be performed on every single acquired frame and in some cases, analysis can be skipped even when a face has been detected, for example, if no movement is detected within the next acquired frame(s) relative to an already analyzed frame.

Upon determining at step 207 a successful detection of Alice's gaze direction toward a target display position, the detected target display position is provided to the metadata generator module 18 of the system 11a, that is also provided by the render module 14 with information about the position and size of the display areas 20-23 as well as information identifying the videoconference participants associated with these areas 20-23. For example, the render module 14 can provide to the metadata generator module 18 information that all the display pixels belonging to the area 20 (delimited in FIG. 4 by the corners at pixel coordinates y1,x1; y1,x2; y2, x1; y2, x2) are allocated for displaying Bob's video signal, as well as information that all the display pixels belonging to the other display areas 21-23 are allocated for displaying Carol's, Dan's and Alice's video signals, respectively.

Based on this information, the metadata generator module 18 determines, at step 208, whether the target display position identified by the gaze understanding module 17 is within one of the display areas 20-22 allocated by the render module 14 for displaying Bob's, Carol's and Dan's video signals.

In the case of the video frame M under analysis, the metadata generator module 18 determines that the target display position identified by the gaze understanding module 17 is within the display area 20 allocated by the render module 14 for displaying Bob's video signal. However, if there is a determination that the target display position identified by the gaze understanding module 17 is outside any of the areas 20-21 (e.g. within the area 22 allocated for displaying Alice's video signal, if Alice is looking to herself on the display 15, or within a display area for displaying a toolbar of the videoconference or a computer taskbar), the method can again proceed to analysing the next frame step 202 in the video signal, if available.

In response to determining that that the detected target display position is within the display area 20 allocated for displaying Bob's video signal, the metadata generator module 18 generates, at method step 209, metadata including Bob's identity (who is identified as the target participant to whom Alice is looking at in the analysed video frame M).

As such, it will be appreciated that when video frames N, O, P illustrated in FIG. 5 are analysed as per the operations of steps 203-209, the metadata generator module 18 will generate:

metadata associated with the video frame N and including, as the previously analysed video frame M, an identity of Bob as the target participant looked by Alice;

metadata associated with the video frame O and including an identity of Dan as the target participant looked by Alice; and metadata associated with the video frame P and including an identity of Carol as the target participant looked by Alice.

Further subsequent video frames in the video signal acquired by the video camera 12 of the system 11a, not illustrated in FIG. 5, can be analysed as per the execution of steps 203-209, resulting in the generation of metadata identifying, for at least some of the further analysed video frames, a respective target participant looked by Alice.

The video signal acquired by the video camera 12 of the system 11a is transmitted to the other client conferencing systems 11b-11d (as well as any further client conferencing system that can be involved in the videoconference and provided with means for displaying video signals), including sending the generated metadata with the associated video frames of the signal (step 210). It is to be appreciated that the mode of transmission of the video frames and associated metadata can vary according to different transmission and encoding protocols or schemes, whereby each transmitted data packet can include, according to the data packet and video frame sizes, a fraction, a single or multiple video frames with the associated metadata generated by the module 18 of the system 11a.

Alternatively, a compression solution can be operated by the system 11a whereby if a sequence of consecutive video frames includes an image of Alice looking at a same target participant (as for example video frames M and N where Alice is looking at Bob), generated metadata identifying the target participant are sent with only the first video frame in the sequence, thus saving transmission/receiving resources of the systems 11a-11d. According to this embodiment, the absence of metadata associated with the other video frames of the sequence is interpreted, at the receiving systems 11b-11d, as Alice continuing looking within these video frames at the same target participant identified by the metadata received with the previous video frame of the sequence for which meta data was provided.

The operation of the method 200 continues until it is determined, at step 205, that there are no more video frames to be analysed (e.g., because Alice has switched off the video camera 12, left the videoconference, or the videoconference is terminated), and the method ends (step 211).

Note that in the above example, the resolution of the metadata corresponds with the size of the display region of the target to which Alice's gaze is directed. This can of course be refined to correspond to a specific area of the target, so allowing more refined re-direction of their gaze as described in more detail below.

In any case, the client conferencing systems 11b-11d use the metadata received with Alice's video frames to retarget Alice's gaze toward a display area allocated for displaying the video signal of the target participant identified by the metadata, as per the operation of the method 300 illustrated in FIG. 3B.

Note that in some cases at some times, the systems 11b-11d will belong to the target of Alice's gaze—for example, the system 11b for Bob for frames M and N. In some implementations, the re-direction of Alice's gaze will tend to make her displayed gaze on Bob's computer appear as if Alice had been looking at her camera directly at Bob.

The effect of this re-direction is as in the prior art referenced above, however, in the prior art, this gaze re-direction is performed in the transmitting client simply to have Alice's gaze re-directed towards her camera, even though she is looking elsewhere. In the present application, gaze re-direction is performed in a receiving client, so enabling the independent re-direction of Alice's gaze on the computers of other participants in the video conference where the effect of the present application is rendered.

In any case, a detailed operation of the method 300 is now disclosed for example at the client conferencing system 11c used by Carol. (Noting that the method can also be operating on the systems of Alice, Bob and Dan.) In this example, it is considered that the video signals received at the client conferencing system 11c from the other conferencing systems 11a, 11b and 11d are displayed, by the render module 14, as per the exemplary display layout illustrated in FIG. 6, where display areas 30, 31, 32 and 33 are allocated for displaying Alice's, Bob's, Carol's and Dan' video signals, respectively.

With reference to FIG. 3b, the method 300 includes a first step 301 where the client conferencing system 11c receives a video signal acquired by the video camera 12 of the Alice's client conferencing system 11a. Note that separate instance of the method 300 will be running for each video signal the system receives from other participants of the conferencing system. Again, step 301 can occur at the beginning of the video conferencing session or during the session when made available by Alice. It is considered for example that the video signal received from the client conferencing system 11a includes the video frame M followed, at some stage, by the video frames N-P illustrated in FIG. 5, with the associated metadata generated as per the above disclosed operation of the method 200.

At step 302, a video frame such as frame M is considered for analysis. In particular, the gaze retargeting module 19 of the system 11c determines, at step 303, whether the video frame M is received with associated metadata identifying a target participant looked at by Alice.

In the case of the video frame M under analysis, the gaze retargeting module 19 determines, at step 302, that the video frame M is received with associated metadata identifying Bob as the target participant. If there were a determination at step 303 that a video frame under analysis does not have associated metadata identifying a target participant looked at by Alice, the method 300 proceeds by displaying (step 307) the video frame (without gaze retargeting) and then analyzing a next available video frame (step 302) within the video signal received from the system 11a.

In response to determining, at step 303, that metadata identifying Bob as target participant are received with the video frame M, the gaze retargeting module 19 of the system 11c (or another dedicated module or component of the system 11c) detects and crops, at step 304, Alice's eye regions within the video frame M.

The gaze retargeting module 19 (or any other dedicated module or component of the system 11c) then detects, at step 305, Alice's gaze direction in the video frame M—again techniques similar to those described in relation to step 204 can be used.

The gaze retargeting module 19 then determines, at step 306, whether the detected gaze direction is directed toward the target participant identified by the metadata received with the video frame M at step 303. In particular, the gaze retargeting module 19 is provided by the render module 14 with information about the position and size of the display areas 30-33, as well as information identifying the videoconference participants associated with these areas 30-33. For example, the render module 14 provides to the gaze retargeting module 19 information that all the display pixels belonging to the area 31 (delimited in FIG. 6 by the corners at pixel coordinates y1,x1; y1,x2; y2, x1; y2, x2) are allocated for displaying Bob's video signal, as well as information that all the display pixels belonging to the other display areas 30, 32 and 33 are allocated for displaying Alice's, Carol's and Dans's video signals, respectively. Using this display layout information, the gaze retargeting module 19 determines if the gaze direction detected at step 305 intersects the display area allocated to the target participant identified by the received metadata, when the video frame under analysis is displayed on the area 30.

Figure 6:
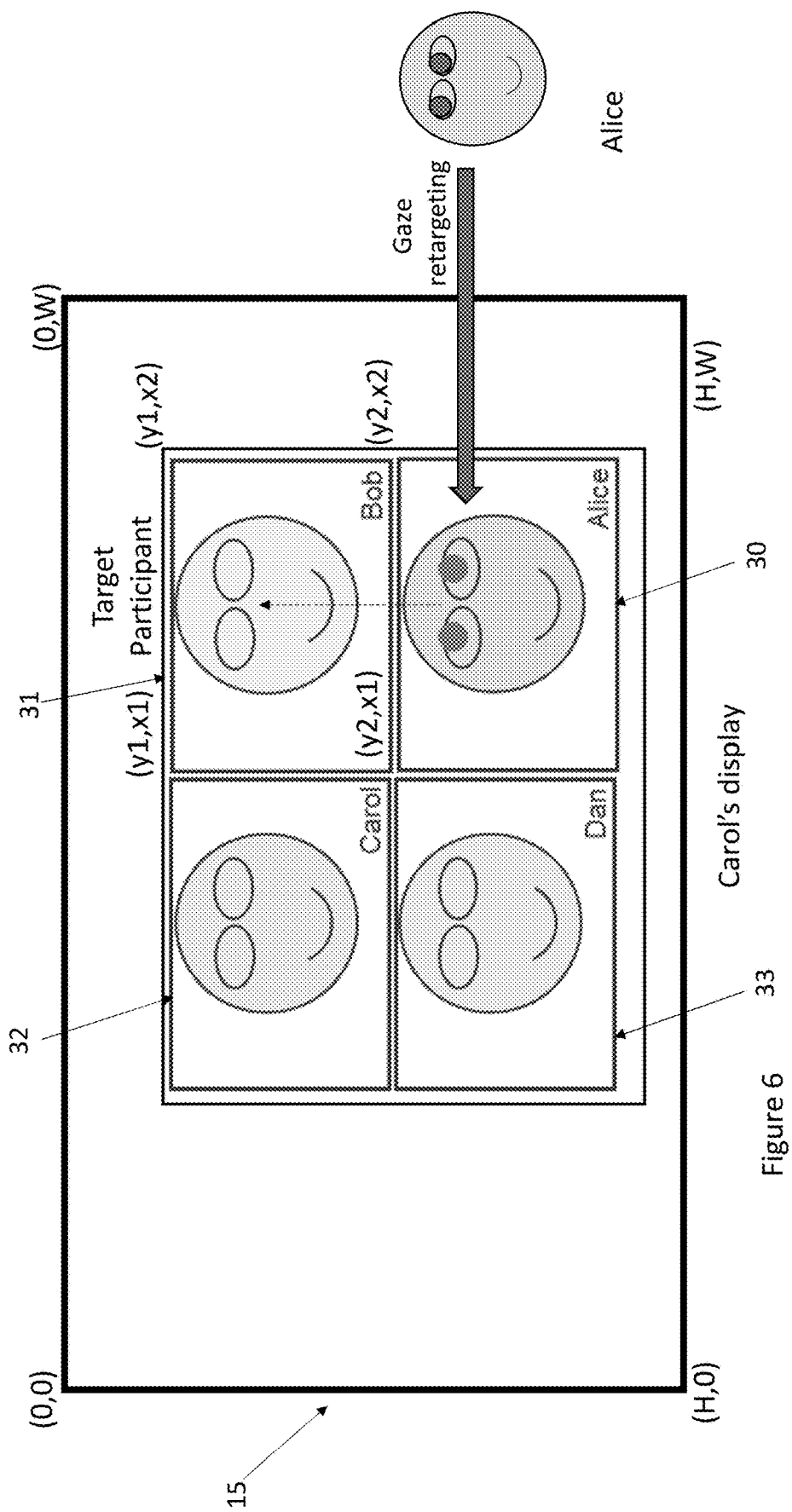
FIG. 6-8 show a gaze repositioning on the displays of three client conferencing systems illustrated in FIG. 1, resulting from the operation of the method illustrated in FIG. 3b.

In the case of the video frame M under analysis, the gaze retargeting module 19 determines that, if the video frame M is displayed on the display area 30 without gaze repositioning, Alice's gaze direction will be directed outside the display area 31 allocated for displaying Bob's video signal according to the display layout illustrated in FIG. 6 (namely toward a top-left portion of the display 15 including the area 32 allocated for displaying Carol's video signal).

However, the result of the determination at step 306 could be different in a different display layout than the one illustrated in FIG. 6, for example, where the display areas 31, 32 allocated for displaying Bob's and Carol's video signals are swapped. In this instance, the gaze retargeting module 19 would determine at step 306 that Alice's gaze is directed toward the display area 31 allocated for displaying Bob's video signal when the video frame M is displayed on the area 30, without requiring gaze repositioning. As such, in this instance the render module 14 displays, at step 307, the video frame M on the display area 30 without gaze modification, and then moves to analyzing the next video frame within the video signal received from system 11a, step 302.

With reference back to step 306, in response to a negative determination the gaze retargeting module 19 determines, at step 310, a target gaze direction based on the provided information about the position and size of the display areas 30-33 as well as the information identifying the videoconference participants associated with these areas 30-33. In particular, in the case of the video frame M under analysis, the gaze retargeting module 19 determines an up target gaze direction from Alice's eye regions to the display area 31 allocated for displaying Bob's signal, when Alice's video frame M is displayed on the below area 30 of the display 15.

The gaze retargeting module 19 then applies, at step 311, gaze retargeting on the cropped Alice's eye regions, according to the determined target gaze direction. For example, the module 19 can output modified eye regions having the target gaze direction using a solution that applies principles similar to those disclosed in Leo F. Isikdogan, "Eye Contact Correction using Deep Neural Networks", Computer Vision and Pattern Recognition, 2019.

In the case of video frame M under analysis, the gaze retargeting module 19 modifies the cropped Alice's eye regions so that, when these regions are repositioned within the video frame M and this video frame is displayed, at step 307, on the allocated display area 30, Alice's eyes appear to look directly up to the above display area 31 allocated for displaying Bob's video signal, as illustrated in FIG. 6. In this way, Carol is aware that Alice is paying attention to Bob.

Alternatively, to perform gaze retargeting by modifying cropped eye regions according to a detected target gaze direction, a retargeting of Alice's gaze toward the display area 31 allocated for displaying Bob's video signal can be performed by: detecting and cropping, in the video frame M under analysis, Alice's head, reorienting Alice's head within the cropped region according to the target gaze direction (so that Alice appears to look up to the display area 31 when the video frame M is displayed in the below area 30 of the display 15), and repositioning the modified head within the video frame M before the frame is displayed.

Furthermore, it is to be appreciated that instead of performing steps 305 and 306, after detecting and cropping Alice's eye regions at step 304, the method 300 can proceed directly to step 310 where a target gaze direction is determined. According to this embodiment, if Alice's gaze direction in a video frame under analysis is already directed toward the target participant identified by the metadata, according to the configured display layout, the application of the gaze retargeting algorithm at step 311 will not substantially change Alice's gaze in cropped eye regions before the video frame is displayed (because Alice's current and target gaze directions substantially correspond).

With reference back to step 307, after the displaying of the video frame M the method 300 proceeds by checking, at step 308, whether there is a next video frame in the video signal received from the client conferencing system 11a. If so, the next video frame is analysed starting from step 303.

As such, with reference back to FIG. 5, frames N, O, P of Alice's video signal (as well as of any further video frame associated with metadata identifying a target participant looked by Alice) are sequentially modified and displayed according to the operation of the method 300. In particular, with reference to the display layout illustrated in FIG. 6:

Alice's gaze within the video frame N is modified in the same way as video frame M, because the video frame N is also associated with metadata identifying Bob as the target participant looked by Alice; and Alice's gaze within the video frame O is modified so that the video frame O is displayed by the render module 14 on the display area 30 with Alice's eyes looking toward a left portion of the display 15 including the display area 33 allocated by the render module 14 for displaying the Dan's video signal (who is identified by the metadata as the target participant looked by Alice in the video frame O).

With reference back to FIG. 3b, when Alice's video frame P is analysed during the operation of method 300, the gaze retargeting module 19 determines that the associated metadata indicates Carol as the target participant looked by Alice, who is the user of the client conferencing system 11c operating the method 300. As such, the gaze retargeting module 19 determines, at step 310, a target gaze direction that is directed perpendicularly out from the display 15 of the system 11c (as if Alice's video frame P was acquired with Alice looking straight into the video camera 12 of the client conferencing system 11a).

Note that in variations of the above approach, the gaze retargeting module 19 could treat a frame received at Carol's computer, where Alice is determined to have been looking at Carol on Alice's computer in the same way as at other participants receiving Alice's video signal. In this case, Alice's gaze would be re-directed, as required, to look towards a displayed image for Carol on Carol's display. This may not, however, be as intuitive for Carol to appreciate Alice is looking at her, as when Alice's gaze is directed out of the display as described above.

According to this determined target gaze direction, the gaze retargeting module 19 then modifies, at step 311, Alice's eye regions so that, when the eye regions are repositioned within the video frame P and the video frame P is displayed (step 307) on the display area 30, Alice's eyes look in a perpendicular direction out of the display 15 of the system 11c. As a result, it appears that Alice is looking directly toward Carol who is positioned in front of the display 15.

The operation of method 300 continues until it is determined, at step 308, that there are no more video frames to be analysed in the video signal received from the client conferencing system 11a (e.g., because Alice has switched off the camera, left the videoconference, or the videoconference is terminated), and the method 300 ends (step 312).

Figure 7:
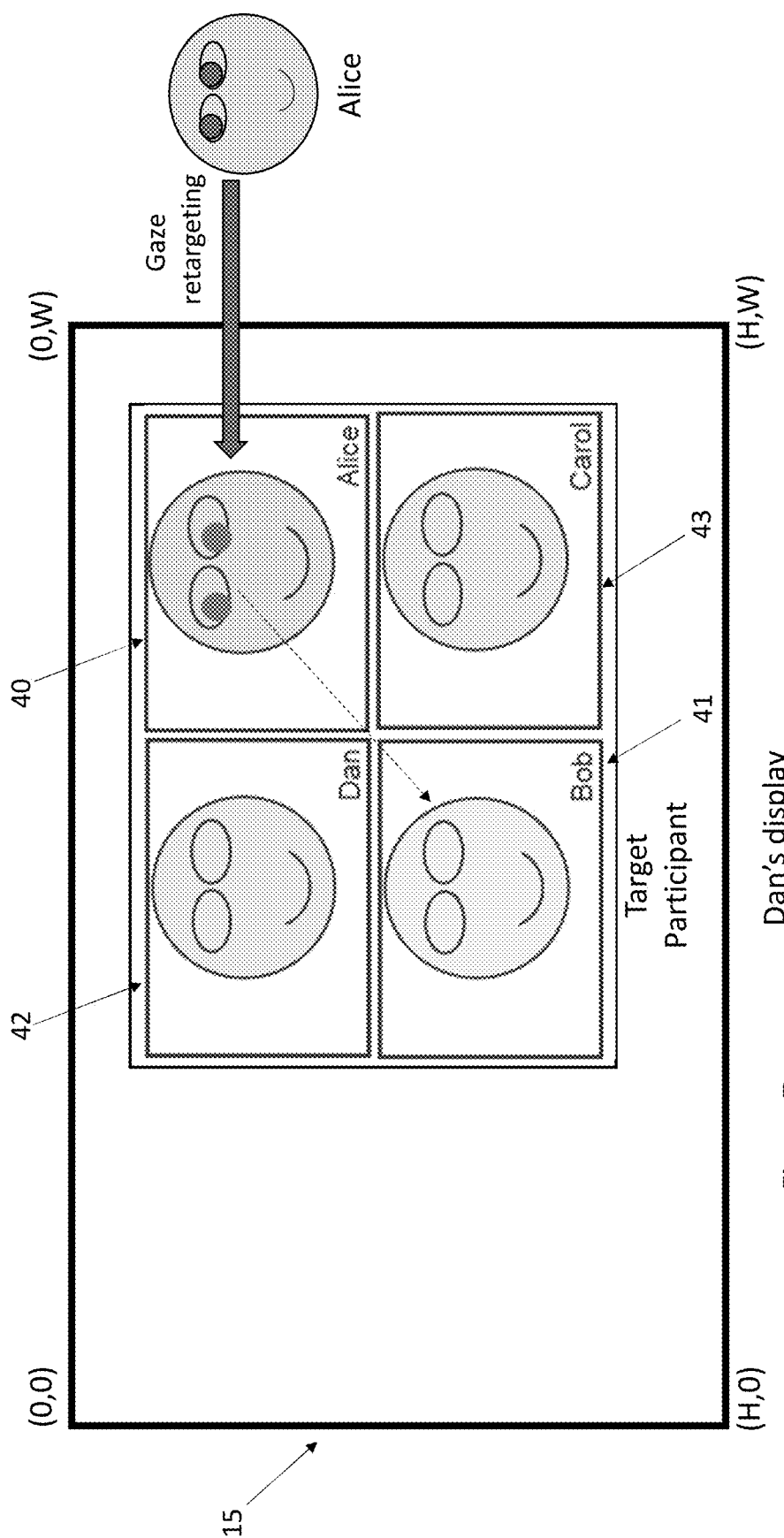
Figure 8:
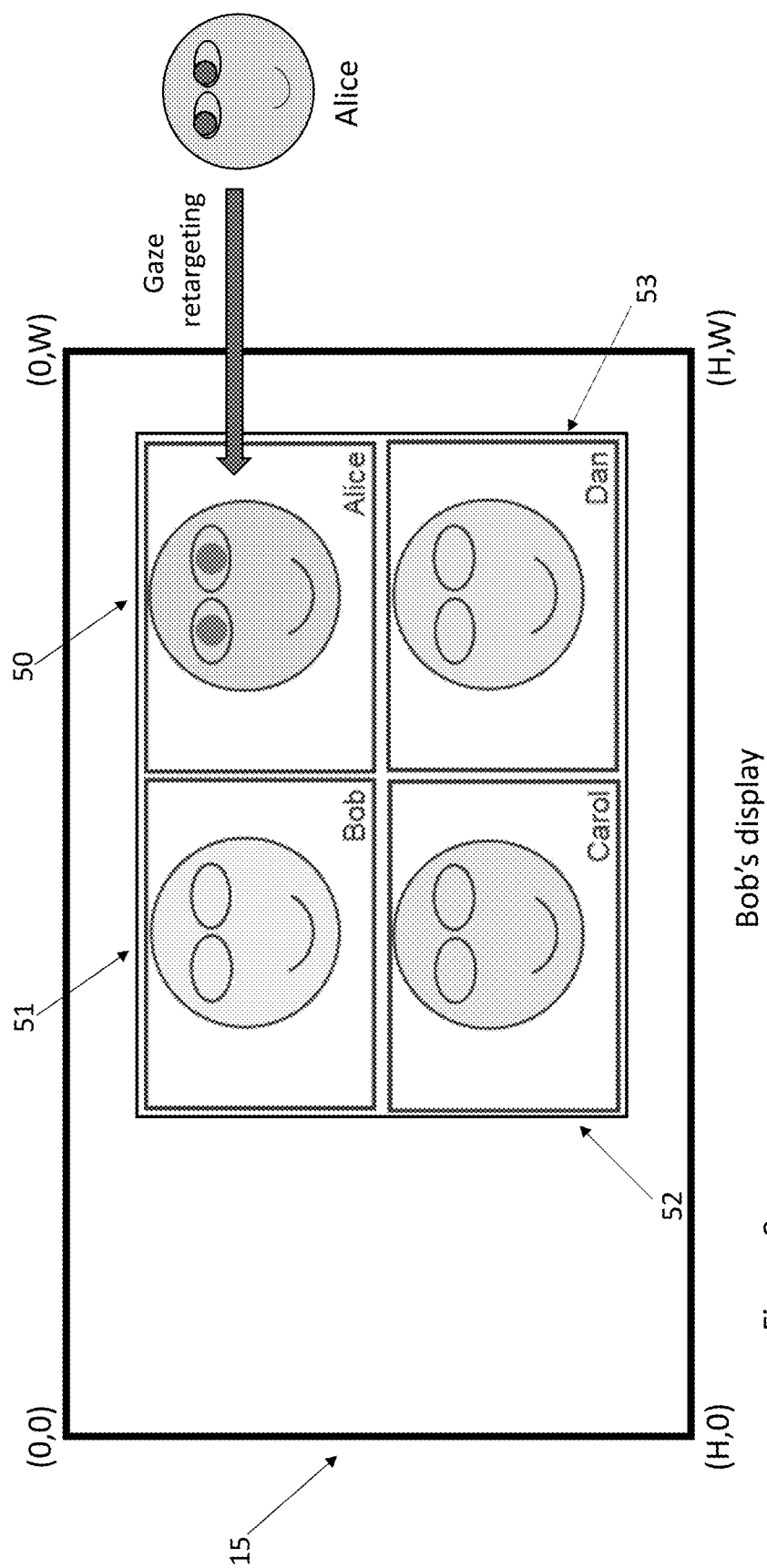

The results of the operation of the method 300 at the other systems 11d and 11b used by Dan and Bob are illustrated in FIGS. 7 and 8, respectively, with reference for simplicity only to the modification of Alice's video frame M illustrated in FIG. 5.

In particular, FIG. 7 illustrates an exemplary display layout configured by the render module 14 of the system 11d, where display areas 40-43 are allocated for displaying Alice's, Bob', Carol's and Dan's video signals, respectively. Alice's image is modified by the operation of method 300 so that the video frame M is displayed, by the render module 14, on the display area 40 with Alice's eyes looking toward a bottom-left portion of the display 15 including the display area 41 where Bob's video is displayed (who is identified by the metadata associated with the video frame M as the target participant looked by Alice).

FIG. 8 illustrates an exemplary display layout configured by the render module 14 of the system 11b, where display areas 50-53 are allocated for displaying Alice's, Bob', Carol's and Dan's video signals, respectively. Alice's image is modified by the operation of the method 300 so that the video frame M is displayed, by the render module 14, on the display area 50 with Alice's eyes looking in a perpendicular direction out of the display 15, because the metadata associated with the video frame M identifies Bob (who is the user of system 11b) as the target participant looked by Alice.

It is to be appreciated that although the client conferencing system 11a has been disclosed above as a transmitting system according to the operation of the method 200, and the other client conferencing systems 11b-11c involved in the videoconference have been disclosed above as receiving systems according to the operation of the method 300, the system 11a can operate as a receiving system for performing gaze retargeting in the video signals received from the other systems 11b-11c according to the operation of the method 300, and any of the systems 11b-11c can operate as a transmitting system for providing, with the video signals of the associated participant, metadata identifying a target participant according to the operation of the method 200.

Figure 2:
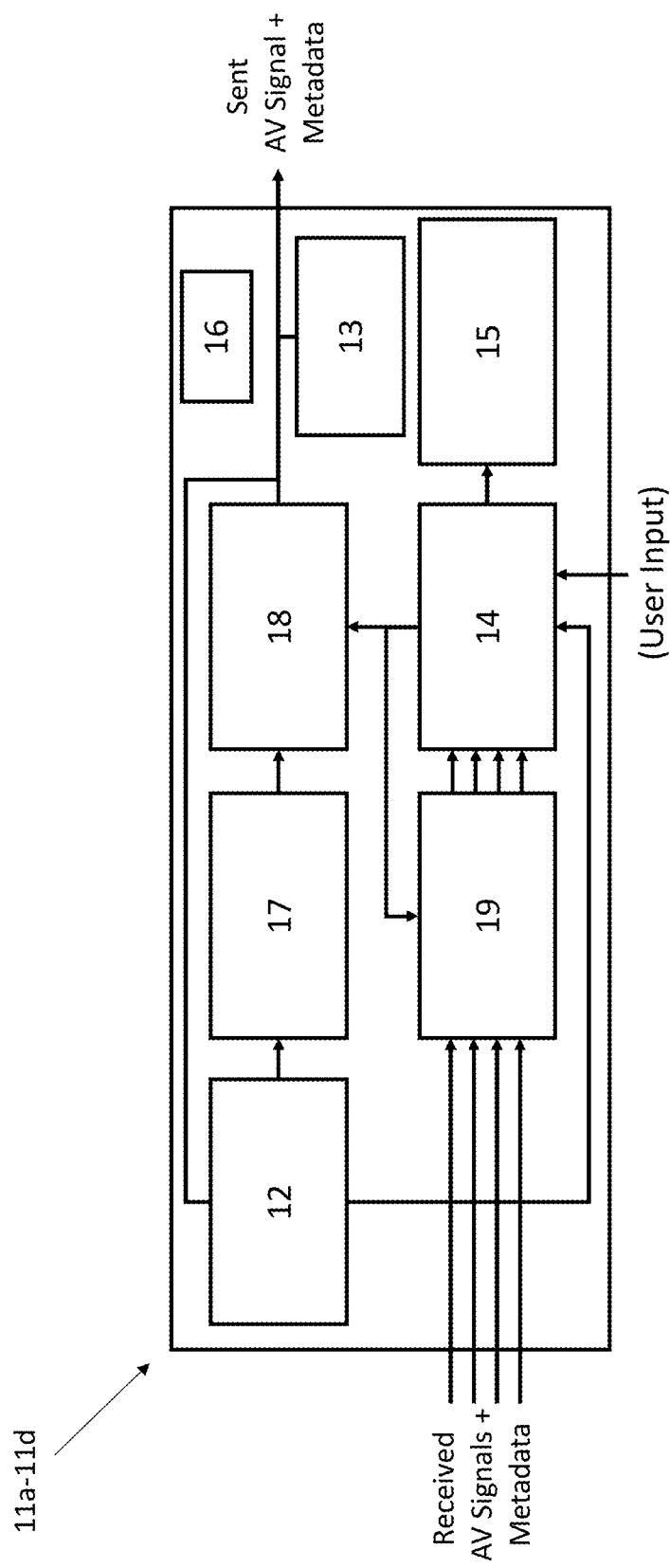
FIG. 2 shows an embodiment of the video conferencing systems illustrated in FIG. 1.

Finally, it is to be appreciated that although the operation of the steps of methods 200 and 300 has been disclosed with reference to the dedicated modules of the client conferencing systems 11a-11d illustrated in FIG. 2, some or all the functionalities of these modules could equally be implemented in software executed by a CPU of the systems 11a-11c, or other dedicated circuitry of the system 11a-11c.

The invention claimed is:

1. A method at a first client conferencing system associated with a first participant of a videoconference and operably in communication with at least a second client conferencing system and a third client conferencing system associated with a second participant and a third participant, respectively, of the videoconference, wherein the first client conferencing system comprises at least a first display, and wherein the second client conferencing system comprises a first video camera and a second display, the method comprising:
receiving, from the second client conferencing system, at least one first video frame of a first video signal acquired by the first video camera, said at least one first video frame including an image of the second participant looking at the third participant on the second display, and first metadata associated with said at least one first video frame and including an identity of the third participant, wherein the first metadata includes information that associates the first participant, the second participant, and the third participant with an adjusted eye gaze for the first participant based on a location of the second participant and the third participant on the first display;
modifying the image of the second participant in said at least one first video frame so that said at least one first video frame is displayed on a first area of the first display configured for displaying the first video signal with the second participant looking at a second area of the first display configured for displaying a second video signal of the third participant identified by the first metadata; and
displaying the modified at least one first video frame on the first area of the first display.

2. The method of claim 1, wherein the third client conferencing system comprises a second video camera, and wherein the method further comprising:
receiving, from the third client conferencing system, the second video signal of the third participant, the second video signal being acquired by the second video camera; and
displaying the received second video signal on the second area of the first display.

3. The method of claim 1, wherein the first client conferencing system further comprises a third video camera, and wherein the method further comprises:
acquiring, by the third video camera, a third video signal, the third video signal comprising at least one second video frame including an image of the first participant looking at a fourth area of the first display configured to display a video signal of a fourth participant of the videoconference;
determining, from the image, a gaze direction of the first participant toward a position within the fourth area of the first display;
generating second metadata associated with said at least one second video frame and including, based on the determined gaze direction, an identity of the fourth participant of the videoconference; and
sending the second metadata with the associated second video frame to at least one client conferencing system associated with a participant of the videoconference.

4. The method according to claim 3, wherein:
either the fourth participant corresponds to said second participant and the fourth area of the first display corresponds to said first area configured to display the first video signal, or the fourth participant corresponds to said third participant and the fourth area of the first display corresponds to said second area configured to display the second video signal; and
wherein sending the second metadata with the associated second video frame to at least one client conferencing system associated with a participant of the videoconference comprises:
sending the second metadata to at least the third client conferencing system, if the second metadata includes an identity of the second participant, or sending the second metadata to at least the second client conferencing system, if the second metadata includes an identity of the third participant.

5. The method of claim 4, wherein determining the gaze direction of the first participant toward a position within the fourth area of the first display comprises:
using stored gaze directions of the first participant toward the corners of the first display, the stored gaze directions being determined from images of the first participant acquired by the third video camera during a calibration phase.

6. The method of claim 1, wherein said modifying the image of the second participant includes:
detecting and cropping at least one eye region of the second participant in the image;
determining a target gaze direction based on the position of the second area in the first display; and
modifying the cropped eye region according to the determined target gaze direction.

7. The method of claim 1, wherein said modifying the image of the second participant includes:
detecting and cropping a head region of the second participant in the image;
determining a target gaze direction based on the position of the second area in the first display; and
reorienting the head within the head region according to the determined target gaze direction.

8. A client conferencing system including at least a display, configured to perform the steps of the method of claim 1.

9. A computer program product comprising a non-transitory computer readable medium on which instructions are stored which, when executed on a computing device of a client conferencing system including at least a display, are configured to perform the steps of claim 1.

10. A method at a first client conferencing system associated with a first participant of a videoconference and operably in communication with at least a second client conferencing system and a third client conferencing system of the videoconference, wherein the first client conferencing system comprises a first video camera and a first display, the method comprising:
   acquiring, by the first video camera, a first video signal, the first video signal including at least one first video frame including an image of the first participant looking at a first area of the first display configured to display a second video signal of the second participant;
   determining, from the image, a gaze direction of the first participant toward a position within the first area of the first display;
   generating first metadata associated with said at least one first video frame of the first video signal and including, based on the determined gaze direction, an identity of the second participant; and sending the first metadata with the associated first video frame to at least the third client conferencing system, wherein the first metadata includes information that associates the first participant, the second participant, and the third participant with an adjusted eye gaze for the first participant based on a location of the second participant and the third participant on the first display-.

11. The method of claim 10, wherein the second client conferencing system comprises a second video camera and a second display, the method further comprising:
   receiving, from the second client conferencing system, at least one second video frame of the second video signal of the second participant, the second video signal being acquired by the second video camera, and said at least one second video frame including an image of the second participant looking at the third participant on the second display, and second metadata associated with said at least one second video frame and including an identity of the third participant; and
   modifying the image of the second participant in said at least one second video frame so that said at least one second video frame is displayed on the first area of the first display with the second participant looking at a second area of the first display configured for displaying a third video signal of the third participant identified by the second metadata; and
   displaying the modified at least one second video frame on the first area of the first display.

12. A client conferencing system including a video camera and a display, configured to perform the steps of the method of claim 10.

13. A computer program product comprising a non-transitory computer readable medium on which instructions are stored which, when executed on a computing device of a client conferencing system including a video camera and a display, are configured to perform the steps of claim 10.

14. A method at a videoconferencing setup system comprising at least:
   a first client conferencing system associated with a first participant of a videoconference and including a first video camera and a first display;
   a second client conferencing system associated with a second participant of the videoconference; and
   a third client conferencing system associated with a third participant of the videoconference and including at least a second display, wherein the first, second and third client conferencing systems are operably in communication one to each other, and wherein the method comprises:
      acquiring, at the first client conferencing system by the first video camera, a first video signal comprising at least one video frame including an image of the first participant looking at a first area of the first display configured to display a second video signal of the second participant;
      determining, from the image, a gaze direction of the first participant toward a position within the first area of the first display;
      generating metadata associated with said at least one video frame of the first video signal and including, based on the determined gaze direction, an identity of the second participant wherein the metadata includes information that associates the first participant, the second participant, and the third participant with an adjusted eye gaze for the first participant based on a location of the second participant and the third participant on the first display;
      sending the metadata with the associated video frame to at least the third conferencing system;
      modifying, at the third client conferencing system, the image of the first participant in said at least one video frame so that said at least one video frame is displayed on a second area of the second display configured for displaying the first video signal with the first participant looking at a third area of the second third display configured for displaying the second video signal of the second participant identified by the metadata; and
   displaying, at the third client conferencing system, the modified at least one video frame on the second area of the second display.

15. A videoconferencing setup system comprising at least:
   a first client conferencing system associated with a first participant of a videoconference and including a first video camera and a first display;
   a second client conferencing system associated with a second participant of the videoconference; and
   a third client conferencing system associated with a third participant of the videoconference and including at least a second display, wherein the first, second and third client conferencing systems are operably in communication one to each other, and wherein the first, second and third client conferencing systems are configured to cooperate one to each other to perform the steps of the method of claim 14.

* * * * *